3,370,081
PROCESS FOR THE MANUFACTURE OF AROMATIC NITRILES

Kurt Sennewald and Wilhelm Vogt, Knapsack, near Cologne, and Alexander Ohorodnik, Liblar, Germany, assignors to Knapsack Aktiengesellschaft, a corporation of Germany
No Drawing. Filed Aug. 10, 1964, Ser. No. 388,689
Claims priority, application Germany, Aug. 17, 1963, K 50,452
7 Claims. (Cl. 260—465)

ABSTRACT OF THE DISCLOSURE

Production of nitriles by oxidizing methyl benzenes or methyl naphthalenes in the gaseous phase with oxygen in the presence of ammonia with a vanadium/tin oxide catalyst on a carrier containing a phosphorus oxide.

---

The present invention is concerned with a process for making nitriles by oxidizing methyl benzenes or methyl naphthalenes in the gaseous phase with oxygen or air in the presence of ammonia on a catalyst.

The present invention is based on the unexpected observation that numerous metal oxides applied onto conventional carrier materials and preferably admixed with phosphoric acid can be used alone or in combination as the catalyst in the above oxidation reaction, e.g. metal oxide catalysts which formerly merely enabled olefins to be oxidized so as to form unsaturated nitriles, especially acrylonitrile, or the olefins to be additively combined in the absence of oxygen with ammonia, the additive combination resulting in the formation of saturated nitriles. Especially in the latter case, the conversion rates and yields were but moderate.

The catalyst is preferably an oxide mixture of the elements vanadium, tin and optionally phosphorus, which are preferably applied onto silica gel serving as the carrier. In this manner, various nitriles can be obtained from cheap raw material with satisfactory conversion rates and yields. Thus, for example, benzonitrile can be prepared according to this invention from toluene or phthalic acid dinitriles can be prepared from ortho-, meta- and para-xylene.

Hydrocyanic acid is most frequently obtained as a by-product which, however, can readily be utilized. The starting products partially undergo combustion into carbon oxides.

The vanadium/tin/phosphorus catalyst which is preferably used is relatively cheap, very resistant to abrasion, ensures the reaction to proceed selectively, and has a bulk density as low as 0.3 to 0.5.

The present invention is more especially concerned with a process for making nitriles, wherein a methyl benzene or methyl naphthalene is oxidized in the gaseous phase with air and/or oxygen in the presence of ammonia and optionally steam at a temperature within the range of 300 to 600° C., under a pressure of 0.1 to 10 atmospheres absolute and within 0.05 to 50 seconds by being contacted with a catalyst comprising one or more oxides of the elements barium, thorium, molybdenum, rhenium, rhodium, palladium, vanadium, antimony, tin, chromium, tungsten, cobalt, iron, manganese, aluminum, nickel, copper, bismuth titanium, zinc, cadmium, silver, gold, lead, niobium, tantalum, uranium, cerium and optionally phosphorus, which are preferably deposited on a carrier material, such as silica gel ($SiO_2$), aluminum oxide, aluminum phosphate, boron phosphate, pumice or the like.

The catalyst preferably consists of an oxide mixture of the elements vanadium, tin and optionally phosphorus and a carrier material. It is especially advantageous to use a catalyst containing, per gram atom vanadium 4.5 to 10 gram atoms tin and 0 to 2, preferably 1 to gram atoms, phosphorus, the elements being present in the form of their oxides.

The catalyst ready for use contains about 50 to 90% by weight carrier. The starting mixture used for making the catalyst is dried or sprayed and thereafter calcined at temperatures of 400 to 800° C., preferably at a temperature of 500 to 600° C. The gaseous reaction mixture is allowed to remain in contact with the catalyst preferably for a period of time of about 0.2 to 20 seconds. 0 to 10 mols steam are used per mol methyl benzene or naphthalene, and 1 to 1.2 mols ammonia and 1.5 to 2.5 mols oxygen, which is preferably air, are used per methyl group in the methyl benzenes or naphthalenes.

The ratio by volume or molar ratio of the methyl benzenes or naphthalenes to ammonia to air to steam is preferably situated at about 1:1:7.5:0 to 1:2.4:20:5.

The oxidation reaction can be carried out while using a solid bed, fluidized bed or flowing bed catalyst.

The following examples serve to illustrate the process of the present invention:

EXAMPLE 1

Preparation of catalyst 259 grams finely divided tin (granulated, chips or powder) were dissolved at about 80° C. in 850 grams 68% $HNO_3$. The resulting partially colloidal suspension of tin dioxide was introduced, while stirring, into 2,600 grams of a 10% aqueous solution of colloidal silicic acid ($SiO_2$) containing 42.8 grams dissolved ammonium vanadate ($NH_4VO_3$), and 42 grams 85% phosphoric acid ($H_3PO_4$). The suspension so obtained could be sprayed directly in an atomizing drying means to yield a catalyst having a given grain size, or could be dried by evaporation of the whole mass, and the dried material comminuted. The dried and comminuted catalyst was then calcined for 24 hours at a temperature of 400 to 700° C., preferably at 500 to 600° C.

The catalyst had the following composition: 1.1% by weight $V_2O_5$; 11.09% by weight $SnO_2$; 0.86% by weight $P_2O_5$ and 87.0% by weight $SiO_2$. The active elements appeared in the catalyst in the atomic ratio of V:Sn:P=1:6:1.

The catalysts used in the following examples were prepared in analogous manner.

EXAMPLE 2

A fluidized bed reactor 5 m. long and 5 cm. wide was charged with 3.5 liters of the catalyst prepared in the manner set forth in Example 1 (bulk density: 0.4 to 0.5; grain size: 0.2 to 0.3 mm.; calcining temperature: 600° C.). 10 mols toluene, 10 to 12 mols ammonia, 0 to 5 mols water and 100 mols air (21 mols oxygen and 79 mols nitrogen) were introduced per hour through a preheater into the reactor at a reaction temperature of 500 to 520° C., a velocity of flow of 1 to 1.5 m./second and for a residence time of the material in the reactor of 3 to 5 seconds.

To determine the toluene conversion rate and the yield, benzonitrile, hydrocyanic acid and unreacted toluene were removed from the issuing gas in conventional manner by condensation at low temperatures, and analyzed by gas chromatography. The off-gas coming from the low temperature condensation step, which contained the decomposition products carbon monoxide, carbon dioxide and residual portions of hydrocyanic acid, was also analyzed by gas chromatography.

85 to 95% of the toluene used underwent conversion. The yield of benzonitrile, calculated on the toluene transformed, was between 50 to 60%, the balance having been transformed into CO, $CO_2$ and CHN.

EXAMPLE 3

The fluidized bed reactor used in Example 2 was charged under analogous reaction conditions, per hour, with 10 mols para-xylene, 20 to 24 mols ammonia, 0 to 10 mols steam and 200 mols air (42 mols oxygen and 158 mols nitrogen). Terephthalic acid dinitrile was obtained in a yield of 50%, calculated on the para-xylene of which 75 to 85% underwent conversion. The remaining 50% of transformed xylene were burnt to CO and $CO_2$.

We claim:
1. In a process for the manufacture of nitriles, wherein a member selected from the group consisting of methyl benzenes and methyl naphthalenes is reacted in the gaseous phase with oxygen in the presence of ammonia at temperatures between about 300 to 600° C., under a pressure between about 0.1 to 10 atmospheres absolute and for a period of time between about 0.05 to 50 seconds by contacting the said member with a catalyst, the improvement which comprises contacting said member with a catalyst consisting essentially of oxides of vanadium, tin and phosphorus deposited on a carrier, said catalyst containing, per gram atom vanadium, about 4.5 to 10 gram atoms tin and about 1 to 2 gram atoms phosphorus, deposited on silica gel as the carrier, the catalyst having been calcined at a temperature of about 400 to 800° C., about 1 to 1.2 mols ammonia and about 1.5 to 2.5 mols oxygen being used per methyl group in the methyl benzene and methyl naphthalene, respectively.

2. A process as claimed in claim 1, wherein the oxygen is used in the form of air.

3. A process as claimed in claim 1, wherein the oxidation is carried out in the presence of steam.

4. A process as claimed in claim 1, wherein the methyl benzene is at least one member selected from the group consisting of toluene, ortho-xylene, meta-xylene and para-xylene.

5. A process as claimed in claim 1, wherein the catalyst contains about 50 to 90% by weight carrier material.

6. A process as claimed in claim 1, wherein about 0 to 10 mols steam are used per mol methyl benzene and per mol methyl naphthalene, respectively.

7. A process as claimed in claim 1, wherein the ratio by volume and molar ratio of the methyl benzene and methyl naphthalene respectively, to ammonia to air to steam is within the range of about 1:1:7.5:0 to 1:2.4:20:5.

References Cited

UNITED STATES PATENTS

| | | | |
|---|---|---|---|
| 2,478,464 | 9/1949 | Denton et al. | 260—465 |
| 2,540,787 | 2/1951 | Klimitas et al. | 260—465 |
| 2,828,325 | 3/1958 | Hardy | 260—465 |
| 2,833,807 | 5/1958 | Farkas et al. | 260—465 |
| 3,278,573 | 10/1966 | Kroeper et al. | 260—465 |

FOREIGN PATENTS

| | | |
|---|---|---|
| 1,071,690 | 12/1959 | Germany. |
| 1,141,274 | 12/1962 | Germany. |

CHARLES B. PARKER, *Primary Examiner.*

D. H. TORRENCE, *Assistant Examiner.*

UNITED STATES PATENT OFFICE
CERTIFICATE OF CORRECTION

Patent No. 3,370,081                 February 20, 1968

Kurt Sennewald et al.

It is certified that error appears in the above identified patent and that said Letters Patent are hereby corrected as shown below:

Column 2, line 3, "preferably 1 to gram atoms" should read -- preferably 1 to 2 gram atoms --. Column 3, line 2, "and CHN." should read -- and HCN. --.

Signed and sealed this 9th day of September 1969.

(SEAL)
Attest:

Edward M. Fletcher, Jr.               WILLIAM E. SCHUYLER, JR.
Attesting Officer                     Commissioner of Patents